United States Patent [19]

Rowland-Hill

[11] 3,742,686

[45] July 3, 1973

[54] AXIAL FLOW COMBINE HARVESTER
[75] Inventor: Edward William Rowland-Hill, Lancaster, Pa.
[73] Assignee: Sperry Rand Corporation, New Holland, Pa.
[22] Filed: May 10, 1972
[21] Appl. No.: 252,120

Related U.S. Application Data
[63] Continuation of Ser. No. 790,145, Jan. 9, 1969, abandoned.

[52] U.S. Cl. .............................. 56/12.9, 130/27 T
[51] Int. Cl. ........................................ A01d 45/02
[58] Field of Search .............. 130/6, 8, 27 T, 27 W, 130/23; 56/12.9

[56] References Cited
UNITED STATES PATENTS
3,464,419  9/1969  Knapp et al. ..................... 130/27 T
3,481,343  12/1969  Van Buskirk ..................... 130/27 T
1,781,472  11/1930  Nagle ................................... 130/23
3,536,077  10/1970  Stott et al. ............................ 130/6
2,098,860  11/1937  Creech .............................. 56/12.9

Primary Examiner—Antonio F. Guida
Attorney—John C. Thompson et al.

[57] ABSTRACT

A combine harvester having two axial flow threshing and separating units in side-by-side relation with feed augers in front for receiving crops from a crop header and infeed conveyor and for drawing crops axially into the units. The threshing and separating units pass grain through concaves and grates onto a grain pan and grain cleaning means and, at the rear, deliver straw onto a straw conveyor for rearward discharge. The clean grain is elevated to a grain tank on top and discharged through a spout at the side.

21 Claims, 16 Drawing Figures

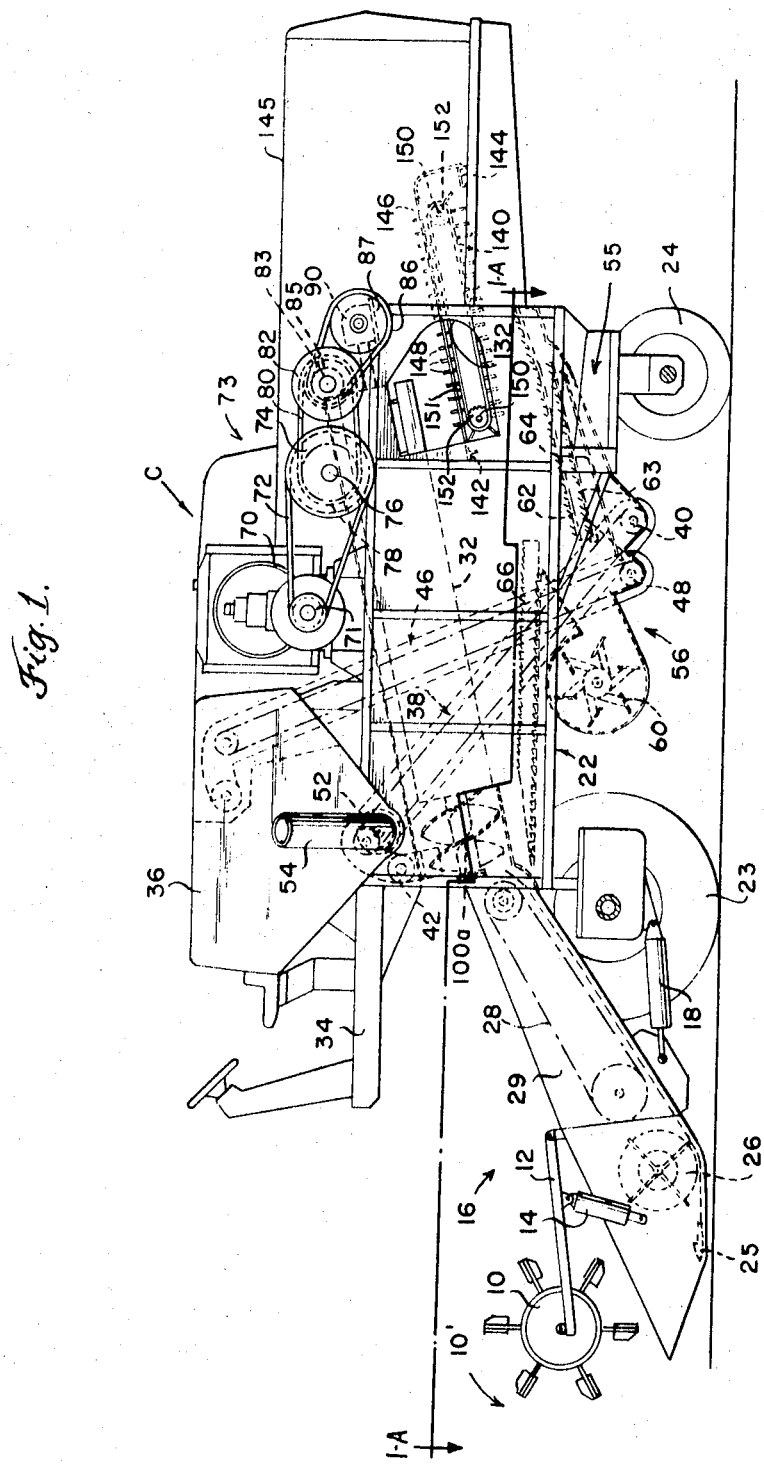

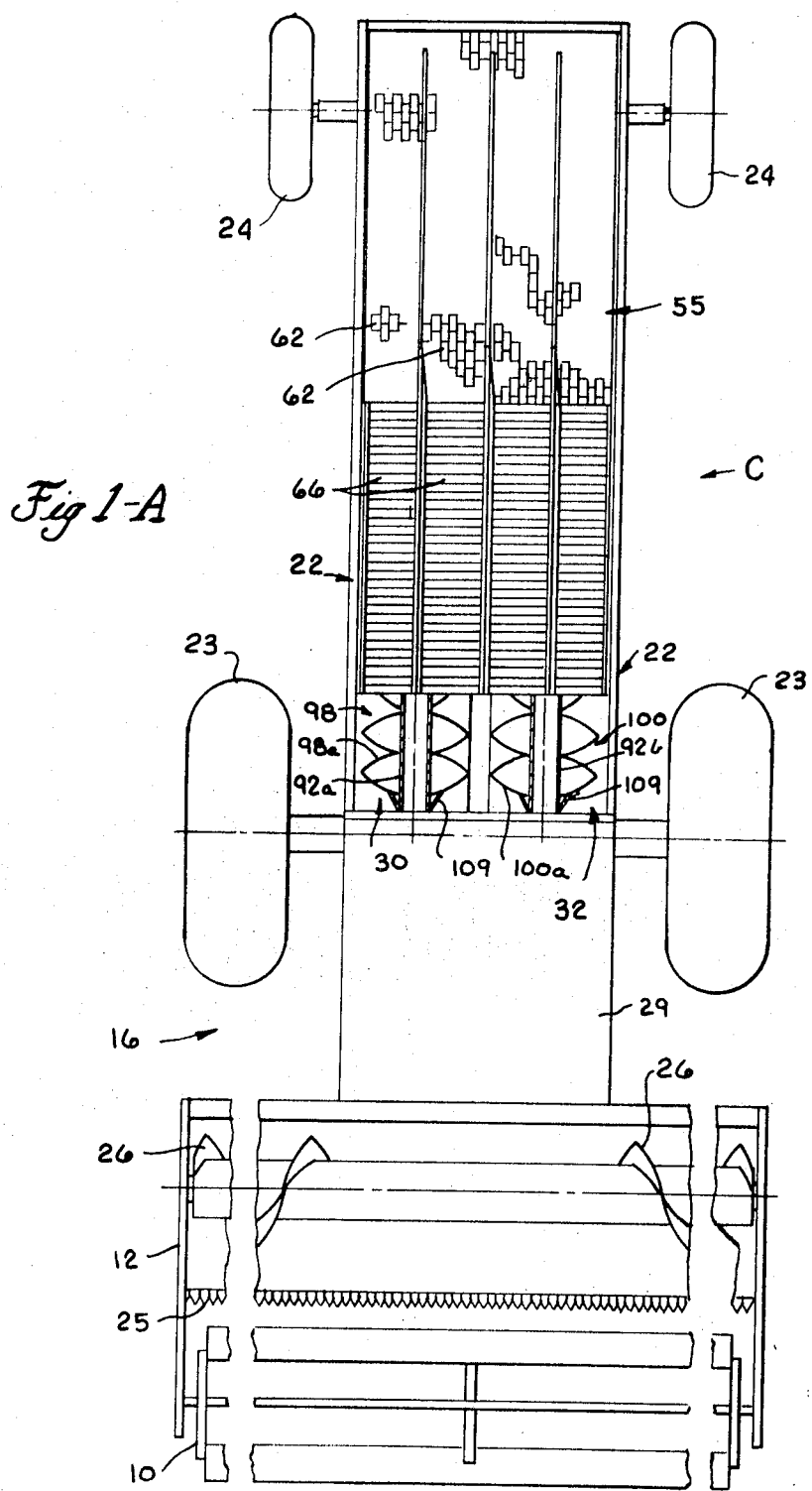

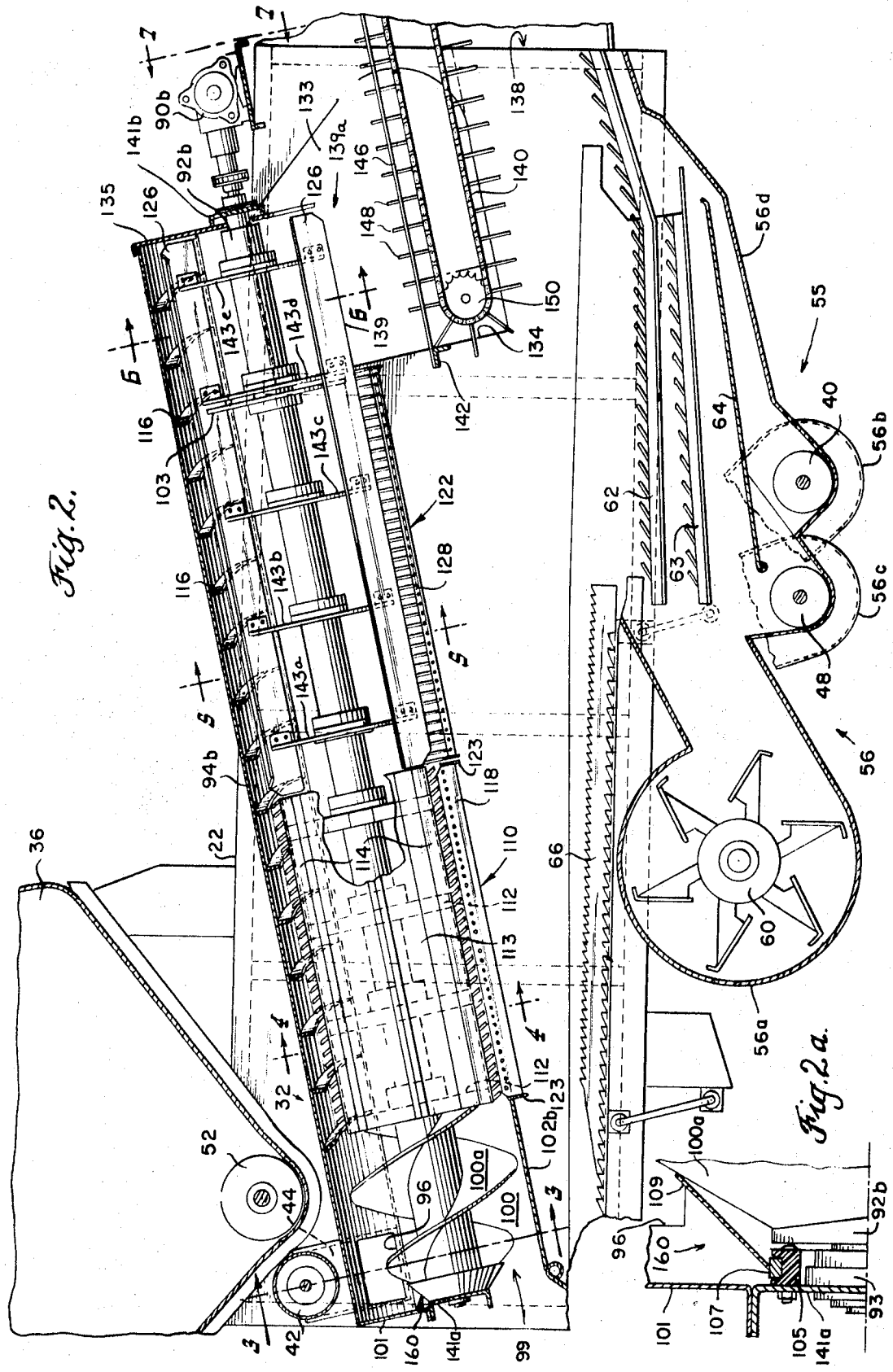

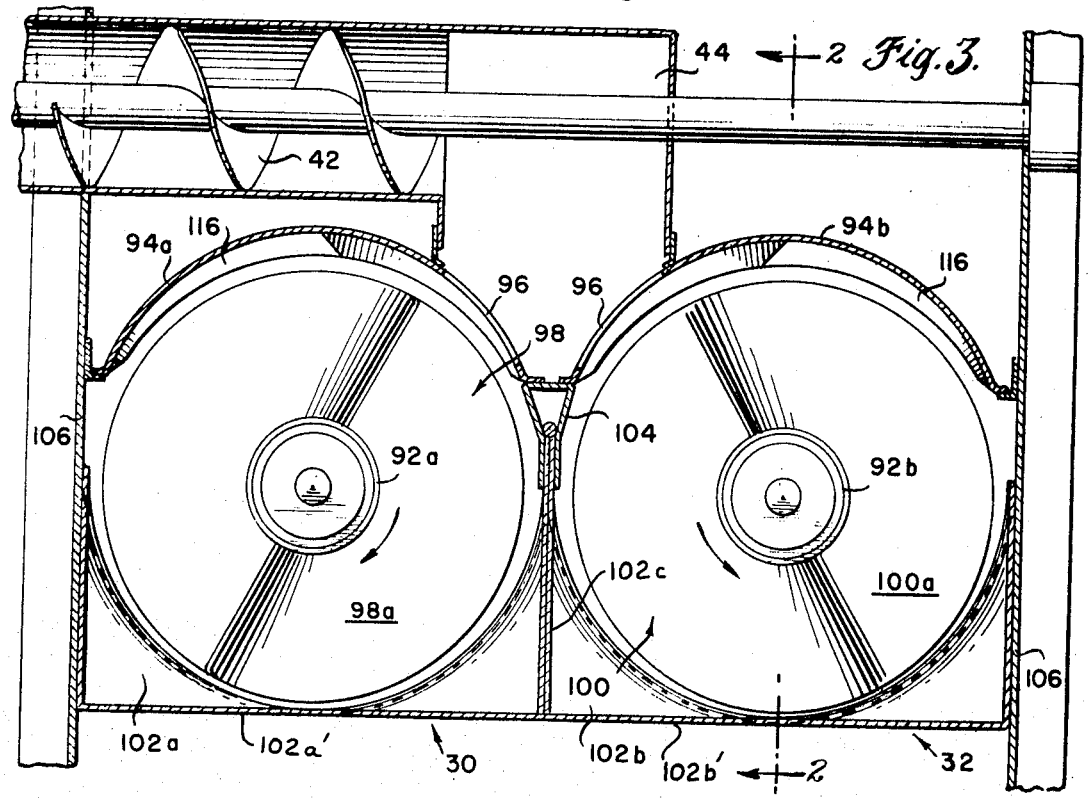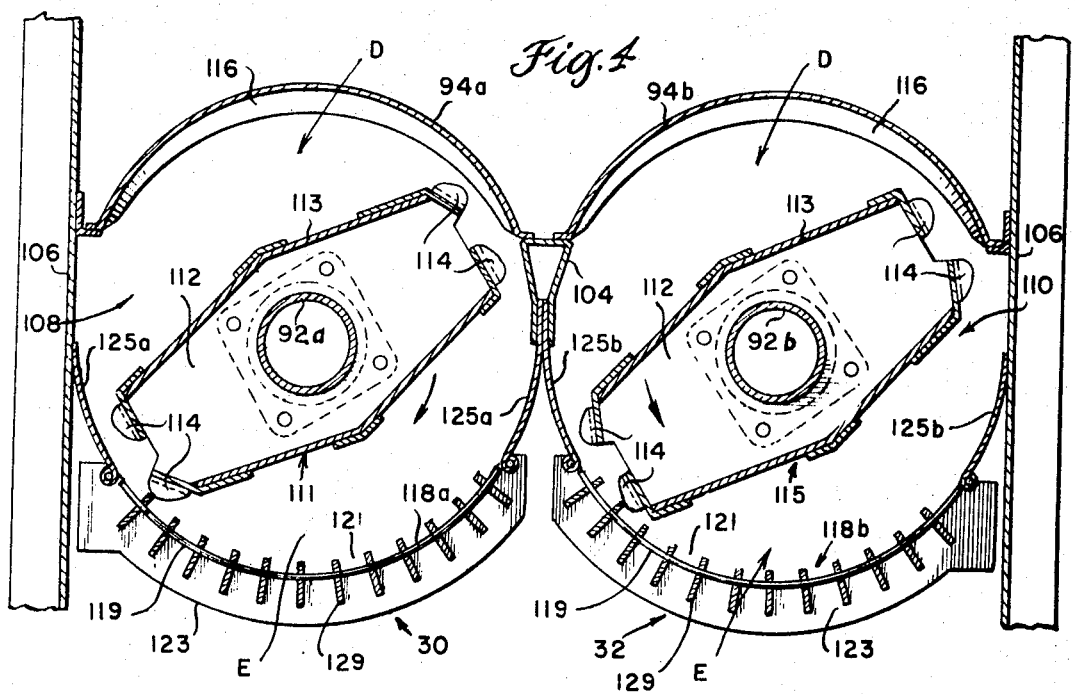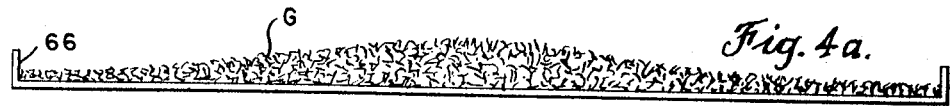

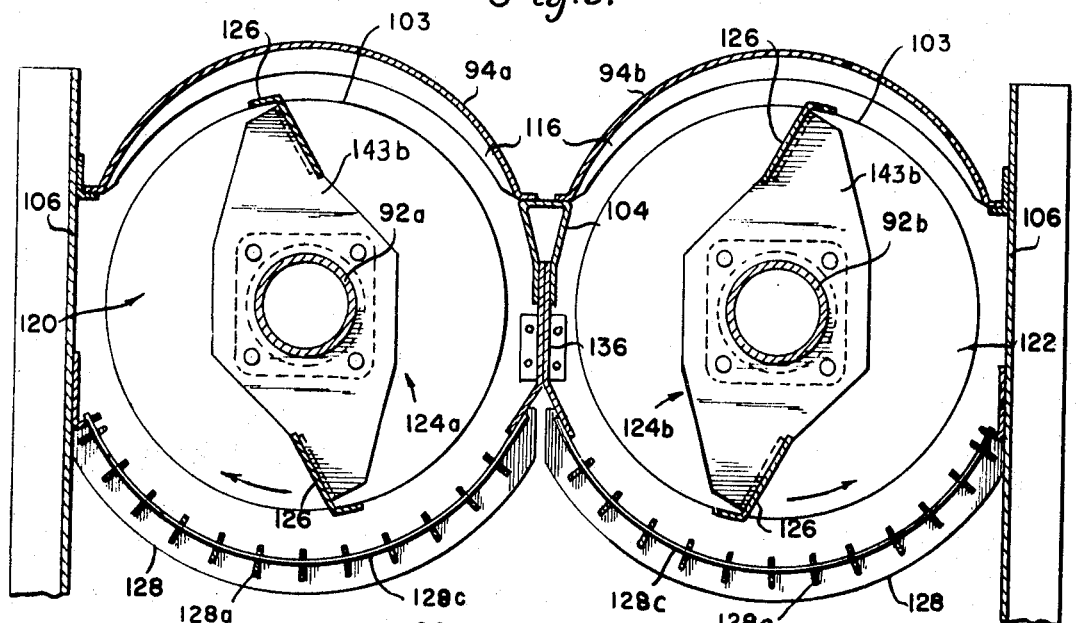
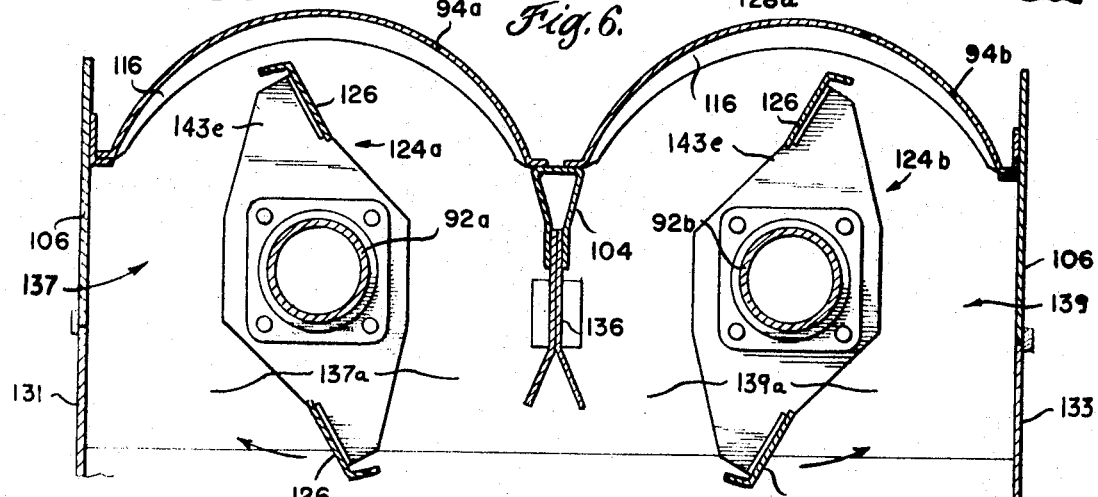
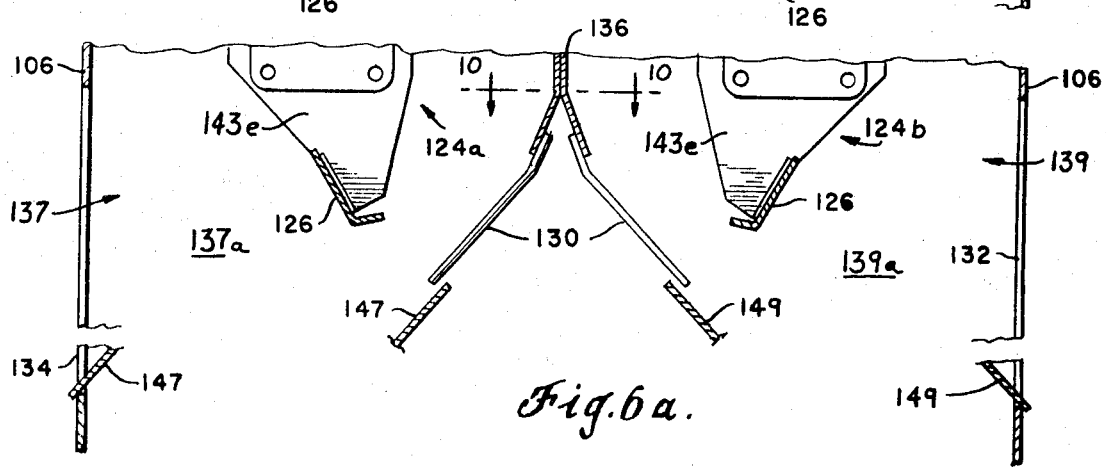

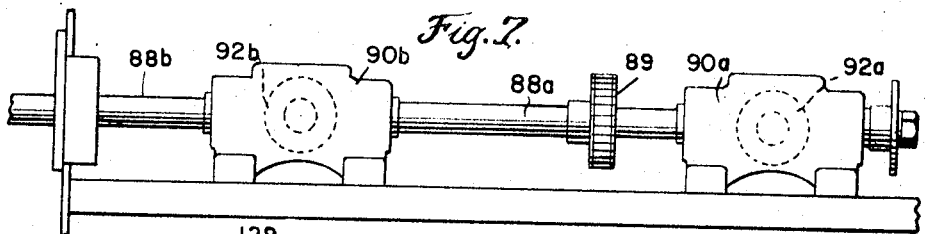
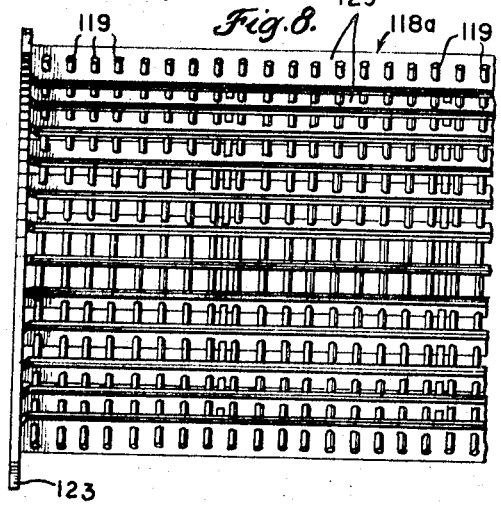
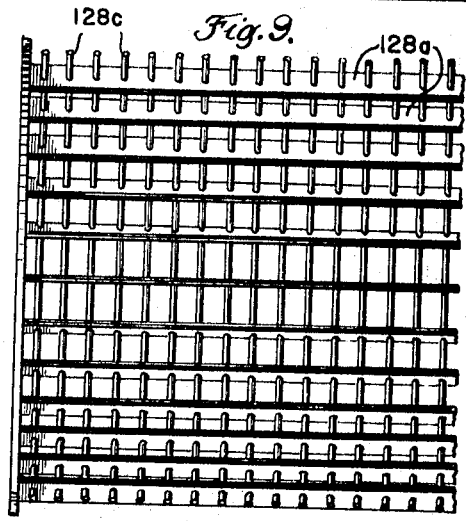
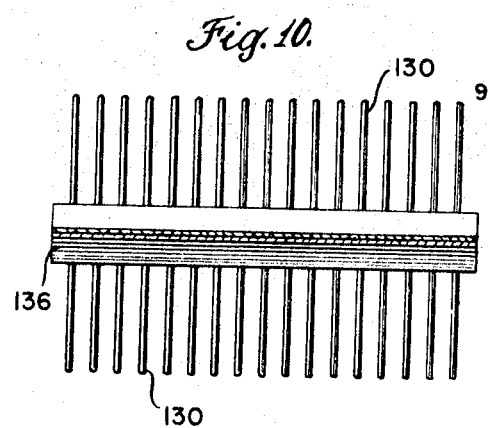
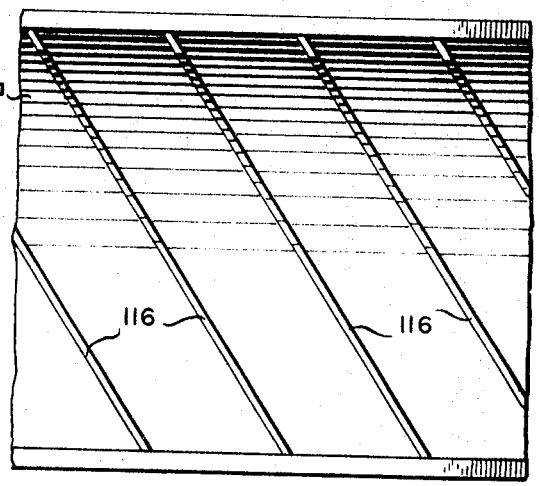
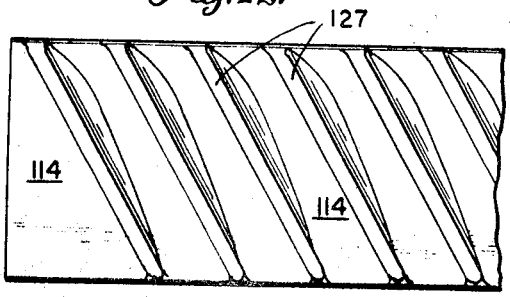

AXIAL FLOW COMBINE HARVESTER

CROSS REFERENCE TO RELATED APPLICATION

This application is a continuation of may application Ser. No. 790,145 filed Jan. 9, 1969, now abandoned.

BACKGROUND OF THE INVENTION

The present invention relates generally to mobile grain harvesting equipment and more particularly to combine harvesters and the like in which improved means are provided for threshing and separating grain from other crop materials such as straw.

As mobile combines are harvesting in the field the grain is threshed, separated and delivered for transport from the field. This is the most economical method for harvesting grain. In the standard commercially available combines the concave and rotating threshing cylinder extend transverse to the direction of movement of the combine. The crop is fed to the side of the concave and passed between the concave and rotating cylinder and the straw is discharged rearwardly on the opposite side of the concave onto straw walkers that extend rearwardly and transversely across the combine. In order to attain even greater economies there is a demand for combines with greater capacities for threshing and storing grain. The size and capacities of the combines have been increased by increasing the length and diameter of the threshing cylinder, the circumferential wrap of the concaves around the cylinder and the length and width of the straw walkers. This increase in size of the threshing cylinder and straw walkers increases the dimensions of associate parts and the overall size and total weight of the combine. The greater weight and size of the grain and straw harvesting components increases the size of the wheels and suspension adding further to the overall weight and dimensions. The width and total weight of the large combines have now reached the practical and permissible limits for field operation, road travel and shipment.

The greater weight presents problems in the flotation or suspension of the combine on the wheels. The suspension must withstand operation on rough terrain, hillsides and road travel at acceptable speeds. Another practical limit is the maximum unit pressure many soils can carry without adverse affects such as undesirable compaction. In order not to exceed this maximum pressure larger and special tires are required. These are expensive and further add to the width of the combine. The greater weight increases the cost of shipment and makes the combined more cumbersome for loading and transport.

As to transverse width, there is a maximum legal width for any behicle to travel on a public highway. The largest combines exceed this legally acceptable width in order to attain higher threshing capacities. Special permits are required to move these combines on public highways. This is bothersome and subject to denial. Also, it is more difficult to drive the oversize combines on a road or highway.

The greater capacity requires a higher combine to accommodate the longer straw walker and a larger grain storage tank. The height is a factor of the trailer transport of combines by the users of the combine from harvesting area to harvesting area and also is providing an optimum field of vision for the combine operator particularly in driving the combine in reverse.

These are illustrative of the shortcomings and also problems of increased size and weight in obtaining greater capacity with conventional combines. Therefore, any increase in the capacity of combines while maintaining acceptable overall dimensions and weight of the combines must be by new and different basic design of combines.

Combines with a single axial flow threshing and separating unit have been considered but fail to meet the requirements for an increased capacity combine. The capacity of such combines does not provide any acceptable advantage over the conventional combines of the same size. The straw mat thickness of a large capacity single axial flow unit is greater than desirable for efficient separation of the threshed grain from the crop material. The grain precipitation pattern is very uneven and unacceptable as the grain piles on one side of the grain handling and cleaning means making it difficult to separate the chaff from the grain. This undesirable piling is further aggravated in hillside operation. Also, feeding problems have encountered with single axial flow units.

An increased capacity combine within conventional combine dimensions has not heretofore been attainable.

OBJECTS AND SUMMARY OF THE INVENTION

An object of this invention is to provide a mobile threshing and separating machine that has an increased capacity over present commercially available machines without increase in size or weight.

Another object of this invention is to provide a mobile threshing and separating machine with an increased capacity over present commercial combines that is permissible to run on public roads and does not exceed desired unit pressure of the wheels with standard combine tires.

Another object of the invention is to provide a combine having a capacity of larger combines at a lower horsepower.

Another object of this invention is to provide a mobile axial flow threshing and separating machine with a relatively even grain precipitation pattern and distribution across the cleaning area.

Another object of this invention is to provide a mobile threshing and separating machine that provides greater latitude in selection of the height over presently available combines and still provides adequate threshing and grain storage capacity.

Another object of this invention is to provide a mobile axial flow threshing and separating machine with threshing and separating units that are not greater in size and weight than the threshing and separating units of presently available combines.

Another object of this invention is to provide a high capacity axial flow threshing and separating machine operating with a low straw mat thickness or density for more efficient separation of grain.

Another object of the invention is to provide an axial flow combine with an axial feeding means that is not fouled by entering cut crops.

These and other objects and advantages of this invention will be apparent from the following description and claims taken in conjunction with the accompanying drawings which illustrate the various features of this invention:

BRIEF DESCRIPTION OF THE DRAWINGS

FIG. 1 is a side elevation view of a combine harvester in which the principles of the present invention have been incorporated;

FIG. 1A is a plan view partially in section, of the combine shown in FIG. 1, this view being taken along the lines 1A — 1A in FIG. 1;

FIG. 2 is an enlarged section side view of the combine with the left hand threshing and separating unit shown in section, taken along lines 2—2 of FIG. 3 with a portion of the threshing rotor broken away;

FIG. 2A is an enlarged fragmentary sectional view of the anti-wrap shield with the shaft and bearing means shown in full;

FIG. 3 is an enlarged cross sectional view of the auger sections taken along lines 3—3 of FIG. 2;

FIG. 4 is an enlarged cross sectional view of the threshing sections taken along lines 4—4 of FIG. 2;

FIG. 4A is a cross sectional view illustrating the grain precipitation pattern on the grain pan underneath the threshing sections;

FIG. 5 is an enlarged cross sectional view of the separating sections taken along lines 5—5 of FIG. 2;

FIG. 6 is an enlarged cross-sectional view of the discharge section taken along lines 6—6 of FIG. 2;

FIG. 6A is an enlarged cross-sectional view of a modification of the discharge sections for side discharge taken along a section similar to section 6—6 of FIG. 2;

FIG. 7 illustrates the transverse rotor drive with right angle gearboxes in the direction of the arrows 7—7 of FIG. 2;

FIG. 8 is a fragmentary plan view of a threshing section concave;

FIG. 9 is a fragmentary plan view of a separating section grate;

FIG. 10 is a downward sectional view of the deflector fingers in the modified separating section taken along lines 10—10 of FIG. 6A;

FIG. 11 is a fragmentary view looking up at the inner surface of the upper wall of the right threshing and separating casing; and FIG. 12 is a fragmentary plan view of a rasp bar on the threshing rotor.

DETAILED DESCRIPTION OF A PREFERRED EMBODIMENT

IN GENERAL

In the following description this invention is described in association with a self-propelled combine harvester. However, it should be noted that this invention is also suitable with other forms of threshing machines, such as for example, a tractor power take-off driven combine. Right-hand and left-hand reference is determined by standing to the rear of the combine harvester and facing the direction of travel. While the terms grain and straw are used principally throughout this specification, it should be understood that the terms are not intended to be limiting. The term grain as used herein refers to all crop material that may be threshed by the mechanism described herein. Similarly, straw refers to all discardable crop material.

The combine harvester C illustrated in FIG. 1 includes a mobile main frame or housing means 22 supported on front drive wheels 23 and rear steerable wheels 24, the wheels being transversely spaced apart on opposite sides of the frame. A crop gathering and harvesting header and infeed conveyor 16 extends forwardly of the main frame and is pivotally secured thereto for vertical movement, the vertical movement being controlled through an extensible hydraulic cylinder 18. Right and left-hand longitudinally extending threshing and separating units 30,32, respectively are carried on the side walls 106 of the main frame 22 and on a longitudinally extending beam 104 intermediate the side walls 106. An operator's platform 34, a grain tank 36, grain handling and cleaning means 55 and a straw conveyor are also mounted on the frame. The various components of the combine C are driven from a conventional power means 70 which customarily takes the form of an internal combustion engine. Only the drive means to the threshing and separating units 30,32 are illustrated in the drawings, the other drive means being generally conventional.

As the combine C is propelled forwardly over a field, the crop material which is to be harvested is separated from the stubble by the cutter 25 on the header 16 and is conveyed by the infeed conveyor 28 to the threshing and separating units 30,32. The material received within the threshing and separating units will be threshed, that is to say, that the crop material (which could be wheat, corn, rice, soy beans, etc.) is rubbed or beaten from the stalks, cobs, or other discardable crop material so that the grain may be separated from the straw.

The threshing and separating units 30 and 32 have axial flow threshing and separating casings of a generally cylindrical configuration and are disposed in a contiguous and parallel side-by-side relation with the parallel axes of the casings lying in a fore-and-aft plane. The units are inclined upwardly toward the rear with the fore-and-aft plane transversely parallel to the ground. The casings are open at their forward portions thereof to receive unthreshed crop material and have a rear opening for straw discharge. The casings also have on top longitudinally extending right and left transversely curved solid upper or top walls 94A,B, respectively, which extend the entire length of the units. The flat side walls 106 of the main frame and the intermediate longitudinally extending beam 104 between the units form solid side walls and also extend the length of the units. The bottom of each of the casings is enclosed by right and left forward transversely curved longitudinally extending concaves 118A,B, respectively, and right and left grates 128. Right and left bottom walls 102A,B, respectively, are disposed forwardly of the concaves.

Right and left hand longitudinally extending rotors are disposed concentrically within each of the casings. The right and left hand rotors include right and left hand shafts 92A,92B, respectively, the forward ends of the shafts being rotatably journalled within the transverse beam 141A and the rear end of the shaft 92A,92B being rotatably journalled within a transverse beam 141B.

It should be noted at this point, that the right and left hand units have feed sections (98,100), threshing sections (108,110), separating sections (120,122) and discharge sections (137,139).

Crop feeding means in the form of right and left feed augers 98A, 100A, respectively, are mounted on each of the shafts forward of the threshing portion to form feed means sections 98,100 with the bottom walls 102A,102B, respectively. Right and left forward longitudinally extending threshing portions 111, 115, respectively are mounted on the shafts 92A,92B and right and left rearward separating portions 124A,124B are mounted on rear portions of the shafts 92A,92B to form with the concaves and grates, respectively, threshing and separating sections.

In the threshing section the material is threshed and a large portion of the grain is separated from the straw and the initially separated grain is delivered to the grain pan 66. A certain proportion of the grain, however, will be conveyed rearwardly into the separating sections with the straw and additional separation of this entrained grain will take place within these sections. The straw is discharged from the rear of the threshing and separating units 30,32 onto a straw conveyor 140 for further separation and discharge of the residue onto the ground.

The grain (and other material) which is separated from the straw will fall onto the grain handling and cleaning means 55, which includes means to separate the chaff from the grain and also means to segregate the unthreshed material (know in the art as tailings). The cleaned grain is then elevated into a grain bin or tank 36 by means of a clean grain elevator 46, and the tailings are raised by the tailings elevator 38 and discharged into the unthreshed material by means of the upper tailings feed auger assembly 42.

HEADER

The header illustrated in FIG. 1 is of the grain type, however, it should be noted that other forms of headers may be employed, as for example, a corn header. The header 16 is provided with a reel 10 carried on an adjustable support 12 which is positioned by hydraulic cylinder 14. During operation the reel 10 rotates in the direction indicated by the arrow 10 to force grain into the sickle bar cutter 25. The severed grain bearing crop material is laterally consolidated by means of two opposed augers 26 which discharge the straw centrally to the infeed conveyor means and housing assembly 28,29 which is pivotally mounted on the frame. The infeed conveyor means 28 within the housing means 29 in turn conveys the material rearwardly to the threshing and separating unit mounted on the combine.

GRAIN HANDLING AND CLEANING MEANS

The grain handling and cleaning means receives the grain which is to be cleaned from the threshing and separating units 30,32 (described in more detail below). The grain handling and cleaning means 55 (FIG. 2) is generally conventional and includes a grain pan 66, a chaffer sieve 62, a grain sieve 63 and a fan 60. The separated grain is discharged from the threshing section and separating section either onto the surface of oscillating grain pan 66 or sieve 62. The majority of the grain falls onto the grain pan which subsequently discharges the grain onto the chaffer sieve 62. The chaffer sieve is provided with means whereby the apertures in the sieve can be adjusted so that grain received on the sieve may fall through the sieve while the trash is shaken rearwardly for discharge, the lighter chaff also being blown rearwardly by means of the fan 60 in the housing 56A (FIG. 2). The grain sieve 63 is provided with apertures which permit only the grain to pass through and down to the grain auger 48, anything larger such as unthreshed heads (referred to as tailings) being discharged to the rear of the sieve 63 onto the chute or guide 56D, which then directs the tailings into a first tailings return auger assembly which includes the trough 56B and the tailings auger 40. The cleaned grain is dropped onto the chute 64 and is then directed to the grain auger 48. The chaffer sieve, grain sieve, and chute 64 are all oscillated in a fore-and-aft direction. As illustrated in FIG. 1A and 4A the grain cleaning means 62, 63, 64 and grain pan 66 of the grain handling and cleaning means is a unitary structure and extends across the combined width of the units 30,32 and the housing means or frame 22. Thus the grain handling and cleaning means is unitary in width. The clean grain auger 48 and the tailings auger 40 are disposed in troughs 56C and 56B, respectively, formed in the lower surface of the bottom casing 56. The grain is conveyed from the trough 56C to the grain tank 36 by means of an elevator 46. The tailings are conveyed to the feed sections 98 and 100 (FIG. 3) of the threshing and separating units 30 and 32 by means of a tailings elevator 38 which raises and discharges the tailings onto the upper tailings feed auger assembly 42, which in turn delivers the tailings into the feed sections 98 and 100 of units 30,32 through compartment 44 and operative means 96 in the upper walls 94A,94B (FIG. 3).

The grain may be discharged from the grain tank 36 by means of the grain unloading auger 52 which forces the grain to the discharge spout 54.

FEEDING AND THRESHING SECTIONS

The feed augers 98A and 100A are double helical members and are rotated at varying speeds between approximately 280 to 1550 rpm to feed the crop axially to the main threshing sections 108 and 110 (FIG. 4). The speed of rotation depends on the type and nature of crop material being handled. As can be seen from FIG. 3 one of the augers 98A,100A is a right-hand feeding auger and the other is a left-hand feeding auger. Both will feed to the rear when rotated in opposite directions as indicated by the arrows in FIG. 3. The rear end of the augers 98A,100A are encased by the rear end of the solid bottom walls 102A,B to peripherally enclose the augers in cooperation with the upper and side walls and beams. As can be seen from FIG. 3 the bottom walls 102A,B extend rearwardly from a generally horizontal leading edge 102A',B' to a semicylindrical configuration about the rear ends of the feed augers 98A, 100A. The adjacent sides of the bottom walls 102A,B are disposed in side-by-side relationship to form a dividing edge 102C. The bottom walls 102A,B are attached to the side walls 106 and beam 104. During operation of the combine the auger sections receive the unthreshed crop material from the infeed conveyor 28 through the forward inlet or opening 99 (FIG. 2), the opening being forced by the forward end of the walls 102A,B, the sides 106, and the transverse beam 141A. The opening above the beam 141A is closed by panel 101. As the augers 98A,100A rotate in opposite directions the unthreshed crop material will be drawn in and divided into two mat sections, one for each of said casings.

The main threshing sections 108 and 110 have threshing portions rotor 111, 115. The threshing portions may have solid sheet metal members 113 extending the length of the threshing section. The members are supported on each side of plate-like spiders 112 mounted on the shafts 92A,B. Threshing elements or rasp bars 114 are mounted in circumferentially spaced apart relation on the periphery of the threshing portions of the rotors and extend longitudinally along the casing. Each rasp bar has rasps 127 (FIG. 12) extending outwardly at an angle to the radial plane. The rasp bars may be provided in pairs at each end of the rotors. The threshing section of the rotors have an elongated or generally elliptical shape in comparison with the generally cylindrical casings. Thus, the width of the rotor sections or portions 111,115 transverse to the diameter length between the rasp bars 114 is substantially narrower or smaller to form the spaces D and E with the casings. The crop material and straw which enters the units 30,32 is directed by centrifugal force against the casing and concaves to form straw mats for separation and movement of the crop material. The straw mat between the rasp bars and the casing has a relatively low density, thus providing a saving in horsepower for threshing the straw. The straw mats are circulated around the casings and repeatedly threshed by the double rasp bars at the ends of the portions 111,115.

In addition to receiving the crop material, the spaces D and E provide ample room to pass debris such as rocks, discarded metal parts and the like without damaging the combine. The debris does not pass between the rasp bars and concaves and thus damage or bending of these important components is minimized.

The main casing has the top walls 94A,B, sides 106, and beam 104 closing the top and sides. Right and left feed plates 125A,B curve downwardly from the beam 104 and sides 106 to the concaves 118A,118B. The bottom portions have longitudinally extending concaves 118A,B each with longitudinal concave bars 129 and slots 121 therebetween. The concaves are preferably formed as a single piece or integral unit with curved beams 123 at each end. As can be seen from FIG. 4 the concaves extend over a minor arc in each casing and are in side-by-side relation across the width of the frame. In this embodiment the concaves 118A,B are fixedly mounted. However, it is preferable that the concaves be simultaneously adjustable to set the spacing between the rasps 127 and concaves 118A,B for best performance depending on the type and condition of the crop material being threshed. In addition to moving the concaves to and from the rasp bars 114 of the threshing rotors the concaves may be set laterally or sidewise so that the concaves are closer to the path of the rasp bars on one side than on the other. Thus the spacing may be narrower at the trailing edge than at the leading edge of the concave. Cylindrically curved wires 119 pass through bars 129 to divide the longitudinal slots 121 into rectangular shape openings (FIG. 8). The length of the openings depends on the type of crop material and threshing conditions. The wires are removable from the threshing sections in a direction transverse to the direction of flow of crop material through openings in the walls 106 (not shown) normally closed by panels (not shown). Therefore, no operating components of the combine obstruct the removal of the wires. Thus the wires are conventiently removed or inserted.

Each of the top walls 94A,B is provided with conveying means in the form of vanes or flights 116 disposed at an angle to the radial plane. As the straw mat is rotated around the threshing section it is deflected or guided rearwardly along the units by the flights or vanes 116 in upper walls 94A,94B of the casings in a generally helical movement. Also, the rasps 127 are at an angle to the direction of movement to assist in moving the straw out of the threshing section.

ROTOR DRIVE MEANS

It is desirable to operate the threshing and separating units at different speeds which are not directly proportional to engine speed. Therefore, it is necessary to provide a variable speed drive between the engine 70 and the threshing and separating units 30,32, this being shown as a variable sheave drive indicated generally at 73. The engine 70 has an output drive sheave 71 which drive a driven sheave 74 mounted on shaft 76 (FIG. 1) by belt 72. A first variable sheave 78 is mounted concentrically with the driven sheave 74 on shaft 76 and is driven by sheave 74. A second variable sheave 82 is mounted on shaft 83 and is driven by belt 80, one portion of which is disposed over the first variable sheave 78. A sprocket 85 is mounted on the shaft 83 concentrically with the second variable sheave 82 and is driven thereby and in turn drives sprocket 87 on one end of the drive shaft 88B (FIG. 7) through chain means 86.

The right end of drive shaft 88B is connected to the left hand gearbox 90B which is coupled to the tubular shaft 92B of the left hand threshing and separating unit 32. The gearbox 90B is also provided with a transversely extending output shaft 88A that is coupled through means of a flexible coupling 89 to the right hand gearbox 90A. The right hand gearbox 90A is coupled to the tubular shaft 92A of the right hand threshing and separating assembly 30. Thus the gearboxes 90A,90B, shaft 88B and coupling 89 interconnect the threshing and separating assemblies 30 and 32 and function as a single or common drive means or power input to drive the rotors of the assemblies at a common rotation speed and in opposite directions downwardly at adjacent sides.

The threshing portions 111,115 of the rotors may be rotated for passing across the concaves at the same time. However, it is preferable that the rotors thresh at different times as shown in FIG. 4. The portions 111,115 are positioned so that one set of the rasp bars 114 of the threshing portion 111 have just finishing cooperation with the concave 118A whereas one set of the rasp bars 114 of the threshing portion 115 are just beginning to cooperate with the concave 118B in the threshing action. The driving of the rotors by the gearboxes 90A,90B is maintained in timed relation by the shaft 88A and coupling 89. The gearboxes 90A,90B, shaft 88A and coupling 89 form a single or common drive means for the rotors. The rotors are angularly offset and out-of-phase in their rotative relation so that the respective threshing traverses of the rotors commence and terminate at different times and, therefore, alternately commence threshing traverses.

In this way, only one of the rotors will be in initial contact with the concaves at any one time. In this way the required horsepower is reduced. One theory for the observed horsepower reduction is that the inertia of the unit which is free of the concave assists the unit which is cooperating with the respective concave.

With the opposite rotation of the rotors the rasp bars approach the concaves adjacent the center beam 104 and move towards the side of the combine. The separated grain G falls onto the grain pan 66.

The downward movement of the rotors at the center produces a discharge of the grain at the center area with the precipitation pattern of the grain G steadily diminishing in density outwards from the center area as illustrated in FIG. 4A. This precipitation responds to the vibration of the grain pan to distribute the grain more evenly over the pan. The grain is then distributed on the sieves 62,63 for good cleaning and separating action. The grain pan is approximately half the length of the threshing and separating units and extends the length of the threshing section and forward portion of the separating sections. The straw mats with entrained grain are circulated rapidly around the casing and are moved longitudinally to the separating sections.

SEPARATING AND DISCHARGE SECTIONS

Following the main threshing sections 108 and 110 are separating sections 120 and 122. Mounted on the shafts 92A,B and rearwardly of the main threshing rotors 111,115 are separating portions 124A,B, each having angularly disposed deflecting blades 126 mounted on spiders 143A,B,C,E,D which are in turn carried by shafts 92A,B. The deflecting blades 126 in the first portion of the separating sections 120 and 122, cooperate with the separating grates 128 to separate grain still left in the straw mat as best illustrated in FIGS. 5 and 9. The grates 128 generally have a wider mesh than the concaves 118A,B. The grates 128 have longitudinal grate bars 128A, with removable transverse wires 128C. The twin separating sections provide a substantial improvement in the separating efficiency by a reduction of mat thickness. The separating portions 124A,124B are aligned respectively with threshing portions 111,115 of the rotors.

As can be seen from FIGS. 2 and 6, right and left discharge sections 137,139 for the discharge of straw from the separating sections 120 and 122, start at the next to the last spider 143. The grates 128 end just beyond spider and the bottoms of the casings have openings 137A,139A (FIG. 6). The ends of the casings or units are closed by plates 135 (FIG. 2). The straw discharged through the openings 137A,139A is received by a straw conveyor 140 for subsequent discharge from the combine harvester.

In FIG. 6A a modified embodiment is illustrated in which the straw is discharged to opposite sides through openings 132,134 in the sides of the frame 22. A deflector means is formed by deflecting fingers 130 mounted on bracket 136 attached to beam 104 and extending into the path of the descending straw. The straw is directed by the fingers 130 and chutes 147,149 through the discharge openings 134,132 in the walls 106 of the frame 22. In the preferred embodiment of FIGS. 1, 2 and 6 there are no openings or the openings 132,134 are closed by panels 131,133. Panel 131 has been removed in FIG. 2 to better illustrate the straw conveyor.

The rotation of the rotors draws in air and dust through openings 99. The air flow is controlled or restricted by discs 103 (FIGS. 2 and 5) in the separation sections. The diameter of the discs depends upon the amount of air flow desired. Sufficient space is provided between the periphery of the disc and the casing for the passage of the straw into the discharge sections. One or more discs may be used in each separating section and positioned at appropriate places depending on the desired air flow. For a single disc in each unit the preferable location is slightly in advance of the discharge end of the grates 128 as illustrated in (FIG. 2).

RESIDUE CROP MATERIAL CONVEYORS AND SEPARATING MEANS

The straw conveyor 140 has the inner end under the openings 137A, 139A to receive the discharged straw. In the embodiment shown in FIGS. 1 and 2 the straw conveyor extends longitudinally in the direction of the threshing and separating sections and moves the straw rearwardly for an end discharge.

At the rear end of the combine frame a discharge opening 138 is provided. The straw conveyor extends through the opening 138 for the discharge of material directly from the back of the machine. Anchor brackets 142 and 144 are provided at opposite ends of the conveyor for supporting a plurality of parallel spaced apart members 146 extending in direction of movement of the conveyor 140. Fingers 148 are mounted on transversely extending spaced rods to impart an apertured open lattice structure to the conveyor and project upwardly between members 146 for engaging and moving the straw rearwardly. The members 146 may be wires or wide perforated channel strips and are carried by right and left chains 151, which run over sprockets 152 on shafts 150. The conveyor 140 permits discharge of the straw material into a single windrow. A covering housing 145 encloses the straw conveyor on the top and sides. The bottom of the housing is open for discharge of the straw.

ANTI-WRAP SHIELDS

At the intake end of the shafts 92A,92B the augers 98A,100A are preferably preceded by cone shaped members or anti-wrap shields 160 (FIGS. 2 and 2C). Each member has an annular collar 107 in retatable relation with a mounting 105 fixedly attached to the beam 141A. The collar is held axially by fitting in an annular groove in the mounting. Conical portions 109 extend circumferentially completely around the forward end of each shaft and flare radially outwardly from the shaft in the direction towards the respective auger and the discharge end of the threshing and separating units. The anti-wrap shields protect the bearing means 93 totatably supporting the shafts 92A,B in the beam 141A. The peripheral edges of the conical portions 109 are spaced from the casings to permit the entry of crops. The leading ends of the helical members extend within the conical member. The cone shaped members or anti-wrap shields prevent the fouling of the shafts by entering crop material that may become entwined about the shafts in the vicinity of the bearing.

OPERATION

The infeed straw conveyor 28 feeds the crop to the threshing and separating units which are in parallel side-by-side arrangement and inclined upwardly towards the rear of the combine C. The auger or feed sections 98 and 100 receive and divide the crop material from the infeed conveyor 28. Tailings are delivered through the openings 96. From the auger sections 98 and 100, the crop is handled by the main threshing sections 108 and 110. The crop material is rapidly fed longitudinally into the spaces D and E and the threshing portions 111,115 of the rotors centrifugally force the crop material against the casing means to beat and rub the crop against the concaves 118,B thereby loosening and discharging the most of the grain through the concaves 118 A,B. The straw or remaining crop material continues to rotate and vanes or flights 116 move the straw mats or remaining of the crop material rearwardly. The straw mats pass repeatedly across the concaves for repeated threshing. The straw mats are then discharged into the separating sections 120 and 122.

The separating portions 124A,B of the rotors have blades 126 for dislodging remaining grain by tumbling and agitating the straw. The grain is separated from the straw by gravity and centrifugal force and discharged through the grates 128. The straw is in form of a mat and the mat density or thickness provides an acceptable separation efficiency in relation to the capacity of the threshing and separating units. The straw continues to be moved towards the end of the threshing and separating units 30 and 32 by means of the flights or vanes 116, and the separating portions 124A,B. The straw or remainder of crop material passes from the separating sections 120,122 into the discharge sections 137,139 where it is discharged downwardly through openings 137A,139A onto members 146 and rearwardly conveyed by fingers 148. The straw is reoriented, and this, with the combing action of the fingers, dislodges a portion of the remaining grain in the straw. The grain passes through the members 146 and lattice-like conveyor.

The opposite rotation of the threshing rotors 111,115 to move downwardly at the center produces a grain precipitation pattern that gradually diminishes from the center area as illustrated in FIG. 4A. This provides a grain distribution that is readily cleaned and separated by the grain cleaning means.

The cleaning and movement of the threshed grain is produced by the flow of air and the vibration or oscillation of the grain pan and sieves. The fan blows air through the chaffer sieve 62 and the cleaning sieve 63 to suspend chaff and other small material in an air stream for discharge through the rear opening 138 of the thresher while the grain passes downwardly onto the chute 64. The vibration of oscillation causes the grain on the grain pan to move rearwardly onto the sieves to be subjected to the air flow from the fan 60. Thus an excellent separation and cleaning of the grain is attained with a separate and rapid discharge of straw, trash and chaff.

SUMMARY OF FEATURES OF THE THRESHING AND SEPARATING MACHINE

It is thus seen from the foregoing description that a threshing and separating machine has been developed which efficiently threshes and separates grain at a greater rate than presently available combines. This is attained without any substantial change in the size or weight of the machine from lower capacity conventional machines. From another point of view, a combine at an acceptable weight and size is provided having a capacity of oversize conventional combines.

More specifically the combined widths of the twin units fit within the same space provided for the transverse threshing cylinder of the largest combine with acceptable maximum width. These twin units have a substantially greater capacity than these conventional combines. The total weight of this twin unit combine is in the order of the lower capacity combines of the same size. The overall length will be comparable to smaller capacity combines.

The total or combined width of the threshing and separating units is approximately the width of the main frame and the casing height or vertical diameter of the threshing and separating unit is approximately half the width of the frame or the combined width.

As to the vertical dimensions, the heights of the side-by-side twin threshing units are less than the overall height of the threshing and beater portions of larger combines of the same capacity. The lower height increases the space for the grain tank. The grain tank either can be enlarged for more grain capacity or can be lowered for improved field of vision of the operator. Since the components of the twin axial combine are smaller, the weight is less than the larger oversize conventional combines of the same capacity.

The axial separating units of this invention process a greater amount of straw more rapidly and efficiently than straw walkers for conventional combines of a similar capacity. Further, the weight and size of the separating units are less for the material handled. Another feature of the invention is the low straw mat thickness for the amount of crop material processed. The two paths of flow of crop material at small diameters permits low mat thickness as compared with the greater mat thickness of larger single axial flow units. This low mat thickness provides a more efficient threshing and separating of the grain at a lower horsepower than for larger less satisfactory single axial units.

The elongated transverse configuration of the threshing rotors which provides the axial extending spaces along the sides of the rotor permits separation of debris from the mat material formed at the casings. The mat material passes between the rasp bars on the rotors and the concave bars while the unwanted debris passes through axial spaces D and E of the threshing section. This avoidance of the jamming of debris between the rasp bars and concaves reduces a cause for damage now present in conventional combines. Also the configuration and spacing of the separating portions 124 from the casing and grates permits the ready passage of debris out of the combine. Debris such as rocks, metal machine parts, and the like rapidly pass through the combine and are discharged without injury to the threshing and separating mechanisms.

The anti-wrap shields at the infeed of the threshing and separating units are particularly advantageous in providing greater versatility to the crops processed and the condition of crops. Crops with long entangling stems or stalks such as barley may be fed into the combine without fouling the shaft at the bearing means.

This versatility of twin rotors also permits opposed rotation of the rotors to provide an acceptable grain precipitation pattern for proper and efficient cleaning of the grain. The grain precipitated over an area underneath the contiguous sides and spreads to the sides of the grain pan. The agitation of the grain pan further spreads and evens the distribution of the grain.

The movement of the grain through the unit is rapid. The rotary members agitate the mat to dislodge entrained grain and circulate the mat around the unit for a rapid discharge of the remaining material from the units with an efficient separation of the grain. The rotary separating units have a greater versatility in speed of operation than straw walkers. Thus within a given space the rotary separator sections can handle a greater amount of crop material.

Another advantage of the twin axial flow threshing and separating units units is the greater convenience in changing the length of the openings in the concaves and grates. In conventional combines the header and infeed conveyor must be removed in order to insert or remove the wires. In the twin axial flow the wires are available through removable side panels.

The greater threshing capacity of the combine described herein is attained within the acceptable overall width and weight of small conventional combines and with additional advantages of versatility of operation, more efficient grain separation from the straw and improved design relation of the components.

The threshing and separating units have been illustrated with rotors having two radial portions or arms. In threshing and separating some types of crop material, rotors with three arms may be used and preferred. A three arm threshing and separating rotor may provide better mat characteristics and smoother operation with some types of crop material. When the three arm rotors are timed so that only one concaves is swept at a given time the circumferential arc of the concaves is 60°. The separating grates may extend over a larger arc.

Also, the rotors may have spikes instead of rasp bars and the concaves may be provided with complementary spikes having spaces for passing the rotor spikes. For ready adaptation to different types of crops the rasp bars and rotor spikes may be readily interchanged through the outer sides of the casings of the respective units.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A combine harvester comprising:
    a mobile frame adapted to be propelled forwardly over a field having standing grain bearing crop material;
    a header mounted on said frame extending forwardly therefrom, said header having means for severing said crop material and infeed means which receives the severed crop material and conveys it rearwardly;
    two threshing and separating casings mounted on said frame and extending in a fore-and-aft direction in substantially side-by-side relation with the axes of said casings lying in a common plane;
    said two casings being open at forward portions thereof to receive said crop material and each casing having a forward transversely curved concave, a transversely curved apertured separating means rearwardly of said concave, a top wall above said concave and separating means, and a rearward opening for the discharge of straw;
    means on said combine harvester for dividing said crop material into two sections, one for each of said casings,
    two fore-and-aft extending rotors, one in each of said casings, said rotors having forward threshing portions and rearward separating portions in operative relation to said concaves and separating means, respectively;
    drive means to rotate said rotors, said rotors upon rotation drawing said divided crop material into said casings;
    the threshing portions of said rotating rotors and said concaves removing grain from said crop material, the grain being discharged through said concaves, the rearward portions of said rotors separating additional grain from the crop material and such grain being discharged through said separating means, the straw remaining after the removal of said grain being passed through said casing discharge openings; and
    grain handling and cleaning means beneath said casings to receive said grain.

2. A combine harvester as recited in claim 1 wherein said grain handling and cleaning means is unitary and receives grain from both of said casings.

3. A combine harvester as recited in claim 1 wherein said unitary grain handling and cleaning means includes a transversely extending sieve assembly disposed beneath both of said casings.

4. A combine harvester as recited in claim 2 wherein said unitary grain handling and cleaning means includes a transversely extending grain pan disposed under both of said concaves and a rearwardly disposed transversely extending sieve assembly disposed at least in part under both of said casing separator means.

5. A combine harvester as recited in claim 1 further characterized by the provision of a first tailings return auger assembly disposed under said grain handling and cleaning means and adapted to receive tailings therefrom, an upwardly extending tailings elevator, and a second tailings return auger assembly disposed above said casings, each of said casings having aperture means therein to receive said returned tailings.

6. A combine harvester as recited in claim 1 wherein the transversely curved concave, the transversely curved apertured separating means, and the top wall for each of the casings is supported at one side on the frame of the concave, and at adjacent sides by an intermediate longitudinally extending beam.

7. A combine harvester as recited in claim 1 wherein said rotors are rotated in opposite directions.

8. A combine harvester as recited in claim 7 wherein said rotors pass downwardly with respect to each other at adjacent sides.

9. A combine harvester as recited in claim 1 wherein said rotors are rotated in timed out-of-phase relationship with respect to each other.

10. A combine harvester as recited in claim 1 wherein the means on the combine harvester for dividing the crop material is disposed rearwardly of the infeed means and forwardly of the concave of each of the two casings.

11. A combine harvester as recited in claim 1 further characterized by the provision of a bottom wall structure, and wherein each of said rotors is provided with crop feeding means forwardly of said forward threshing portions, said crop feeding means cooperating with said bottom wall structure to draw in unthreshed crop material from said infeed means and divide said unthreshed crop material into two mat sections, one for each of said casings.

12. A combine harvester as recited in claim 11 wherein said rotor crop feeding means are augers.

13. A combine harvester as recited in claim 11 wherein one of the rotor crop feeding means is a right-hand feeding auger and the other one of the rotor crop feeding means is a left-hand feeding auger, and wherein said drive means rotate said rotors in opposite directions downwardly at adjacent sides, the oppositely flighted augers cooperating with the bottom wall structure to divide said crop material received from said infeed means into two mat sections, one for each of said casings.

14. A combine harvester as recited in claim 11 wherein the rear end of the bottom wall structure peripherally encloses the rotor feed means.

15. A combine harvester comprising:
a mobile frame adapted to be propelled forwardly over a field having grain bearing crop material;
two generally cylindrical casings carried by said frame in generally horizontal side-by-side relation, said casings having concaves extending longitudinally along the bottom of respective casings;
means on said combine harvester for dividing said crop material into two sections, one for each of said casings;
longitudinally extending rotors in said respective casings having peripherally spaced apart threshing elements cooperating with said respective concaves for threshing grain-like material from unthreshed crop material;
means for rotating said rotors in opposite directions and downwardly at adjacent sides of said casings with said concave positioned to drop grain-like material in a longitudinal mid-area beneath adjacent sides of said casings, whereby threshed grain precipitates in diminishing depths outwardly from the center area, and
unitary grain handling and cleaning means mounted on the frame underneath both of said concaves, the grain dropping through said concaves being received by the grain handling and cleaning means in a transverse precipitation pattern rearrangeable into a distribution cleanable by a flow of air through the grain handling and cleaning means.

16. A combine harvester comprising:
a mobile frame adapted to be propelled in a forward direction over a field of grain bearing crop material;
means operable to sever unthreshed grain bearing crop material from its stubble;
an infeed conveyor means and housing mounted on said frame and extending forwardly therefrom, said housing supporting the severing means, and said conveyor means being operable to receive the unthreshed grain bearing crop material and to convey it rearwardly towards the frame in a relatively flat mat;
two axial flow threshing and separating casings mounted in said frame and extending rearwardly from said infeed conveyor in substantially side-by-side relation with the axes of said casings lying in the same plane, the casings having two transversely curved longitudinally extending forward concaves, two transversely curved rearward apertured separating means following said respective concaves, and two transversely curved top walls extending longitudinally in spaced relation above said respective concaves and apertured separating means;
means on said combine harvester for dividing said crop material into two sections, one for each of said casings;
two rotors extending longitudinally, one in each of said cylinders, and having circumferentially spaced apart forward threshing portions and rearward separating portions in operative relation to said casing concaves and said apertured separating means;
means interconnected with said rotors operable to rotate said rotors in opposite directions and downwardly at adjacent sides, the threshing and separating portions of said rotors during rotation being operable to engage the unthreshed grain bearing crop material received from said end feed conveyor means and to advance it generally helically along the inner periphery of each of said casings in a relatively thin mat, the forward threshing portions of the rotors cooperating with the concaves to thresh grain and to discharge a portion of the threshed grain through said concaves, the rearward separating portion being cooperable with the apertured separating means to discharge a further portion of the threshed grain through said apertured separating means; and
grain handling and cleaning means underneath said cylinders to receive the discharged grain, the grain dropping through said concaves and said apertured separating means being received by the grain handling and cleaning means in a transverse precipitation pattern rearrangeable into a distribution cleanable by a flow of air through the grain handling and cleaning means.

17. In a combine harvester having
a frame adapted to be propelled forwardly over a field of grain bearing crop material,
a header mounted on said frame and extending forwardly therefrom, said header being provided with means to separate grain bearing crop material from its stubble and means to convey the separated grain bearing crop material rearwardly towards said frame, and
grain handling and cleaning means carried by said frame and operable to receive grain separated from the aforesaid separated grain bearing crop material and to clean the grain;
the combination thereof of:
two axial flow threshing and separating units operable to thresh the grain bearing crop material conveyed rearwardly by said header and to separate grain from its straw, said two axial flow threshing and separating units including
two threshing and separating casings mounted on said frame and extending in a fore-and-aft direction in substantially side-by-side relation with the axes of said casings lying in a common plane, said two casings being opened at the forward portions thereof to receive said grain bearing crop material and each casing having a forward transversely curved concave, a transversely curved apertured separating means rearwardly of said concave, a top wall above said concave and separating means, and a rearward opening for the discharge of straw;
two fore-and-aft extending rotors, one in each of said casings, said rotors having forward threshing portions and rearward separating portions in operative relation to said concaves and separating means, respectively; and
means on said combine harvester for dividing said crop material into two sections, one for each of said casings;
drive means operable to rotate said rotors in opposite directions and downwardly at adjacent sides whereby more grain is normally received on the mid longitudinally extending area of the grain handling and cleaning means than is received on the side areas of the grain handling and cleaning means.

18. A combine harvester mounted on a mobile frame supported on wheels to move in a longitudinal direction with at least two wheels transversely spaced on opposite sides of said frame and comprising
  two axial flow threshing and separating casings having respectively forward crop material intakes, rear crop material discharges and conveying means between said intakes and discharges for generally helically and rearwardly guiding crop material rotating in said casings,
  two longitudinally extending rotors rotatably mounted in said casings,
  drive means connected to said rotors for rotating said rotors in timed relation, said rotors during rotation cooperating with said conveying means to move crop material from said respective intakes to said respective discharges
  said casings being in adjacent side-by-side relation with longitudinal axes parallel and in an inclined plane extending upwardly and rearwardly, and with the combined width of said casings being substantially greater than the vertical diameters of the casings and less than the spacing of the transverse wheels,
  said casings each having longitudinally extending threshing means extending circumferentially over a minor arc, said casing threshing means being in side-by-side relation substantially across the width of the frame, said rotors each having longitudinally extending threshing means, passing in separate threshing actions with respective casing threshing means to detach grain from the crop material and pass the detached grain through the casing threshing means across the combined width, said threshing means of each rotor being circumferentially spaced in a given circumferential alignment to sweep said respective threshing means, and said drive means rotating said threshing means of said two rotors in timed out-of-phase relation to distribute the threshing actions, and
  unitary grain handling and cleaning means mounted on the frame underneath both of said casing threshing means, said grain passing through the casing threshing means being received by the grain handling and cleaning means in a transverse precipitation pattern rearrangeable into a distribution cleanable by a flow of air through the grain handling and cleaning means.

19. A combine comprising:
  a wheeled frame adapted to be propelled forwardly over a field of grain bearing crop material, said frame having a forward inlet end and a discharge;
  a forwardly extending infeed conveyor and housing mounted on the front end of said wheeled frame;
  infeed conveyor means in said housing and operable to deliver a mat of unthreshed grain bearing crop material rearwardly to said forward inlet;
  a pair of side-by-side longitudinally extending axial flow threshing and separating units mounted within the frame, each of said units including a generally cylindrical casing and a rotor mounted for rotation within the casing, said casing having an open forward inlet, an intermediate concave, and an open discharge outlet, and said rotor having a plurality of circumferentially spaced apart rasp bars, the rotor being operable upon rotation to cause the rasp bars in cooperation with the concave to thresh grain from the unthreshed grain bearing crop material conveyed to said units and to generally helically advance the crop material through said casing while separating a large proportion of the threshed grain from the residue of the crop material, the residue of the crop material being discharged through the discharge outlet;
  residue crop material conveying and separating means at the rear ends of said casings, said conveying and separating means including a longitudinally movable conveyor and an apertured structure over which the discharged residue of the crop material is adapted to be conveyed by said conveyor, said conveying and separating means being operable to receive the residue of the crop material generally helically conveyed through said casings and discharged through the discharge outlets and to move the residue in a different direction for reorientation of the residue of the crop material for further separation of grain from the residue of crop material, the grain passing through said apertured structure.

20. A combine as set forth in claim 19 wherein said apertured structure comprises a plurality of parallel spaced apart longitudinally extending members, and said movable conveyor comprises a plurality of fingers mounted on transversely extending spaced rods, said fingers projecting through said longitudinally extending members.

21. A combine harvester comprising:
  a mobile wheeled frame adapted to be propelled in a forward direction over a field of grain bearing crop material;
  means operable to sever grain bearing crop material from its suitable and to laterally consolidate the severed crop material;
  an infeed conveyor and housing mounted on said frame and extending forwardly therefrom, said housing supporting the severing and consolidating means, and said conveyor being operable to receive the consolidating crop material and to convey it rearwardly towards the frame in a relatively flat mat;
  two axial flow threshing and separating units mounted in said frame, said units including two casings disposed in abutting side-by-side parallel relation with the axes of the casings lying in the same plane, each of the casings having a forward inlet opening, a transversely curved longitudinally extending concave substantially spanning a transverse threshing width, a transversely curved longitudinally extending grate following said concave, and a rearward discharge opening; said units also including two rotors, each rotor being rotatably mounted within an associated casing and including circumferentially spaced apart forward threshing portions, and rear separating portions, and
  said units also including
  feed means spaced forwardly of said concaves, said feed means being capable of receiving and dividing the crop material received from said conveyor and feeding the crop material into said casings in divided streams,
  common drive means having interconnected means for rotating said rotors at a common rotational speed and in opposite directions downwardly at adjacent sides, the threshing portions of one rotor being maintained in an angularly offset relation with respect to the threshing portions of the other rotor in such a manner that during rotation the threshing portions will alternately commence threshing traverse over their associated concaves, said units being operable upon rotation of said rotors to thresh grain from the unthreshed grain bearing crop material and to discharge a portion of the threshed grain through said concaves, to discharge a further portion of the threshed grain through said grates, and to discharge the residue of crop material through the rearward discharge opening of said casings, residue crop material conveying and separating means at the rear ends of said casings, said conveying and separating means including a longitudinally movable conveyor and an apertured structure over which the discharged residue of the crop material is adapted to be conveyed by said conveyor, said conveying and separating means being operable to receive the residue of the crop materially conveyed through said units and to move the residue in a different direction for reorientation of the residue of the crop material for further separation of grain from the residue of crop material, the grain passing through said apertured structure, and unitary grain handling and cleaning means underneath both of said casings and said residue crop material conveying and separating means, said grain being discharged through said concaves, grates, and apertured structure being received by said grain handling and cleaning means in a transverse precipitation pattern rearrangeable under agitation of the grain handling and cleaning means into a distribution cleanable by a flow of air through the grain handling and cleaning means.

* * * * *

UNITED STATES PATENT OFFICE
CERTIFICATE OF CORRECTION

Patent No. 3,742,686          Dated July 3, 1973

Inventor(s) Edward William Rowland-Hill

It is certified that error appears in the above-identified patent and that said Letters Patent are hereby corrected as shown below:

Column 1, line 4, "may" should read -- my --; line 51, "combined" should read -- combine --; line 54, "behicle" should read -- vehicle --. Column 5, line 59, cancel "the", second occurrence. Column 7, line 56, "conventiently" should read -- conveniently --. Column 10, line 26, "retatable" should read -- rotatable --; line 35, "totatably" should read -- rotatably --; line 56, "118,B" should read -- 118A,B --. Column 12, line 57, cancel "units", second occurrence. Column 13, line 10, "concaves" should read -- concave --. Column 14, line 10, "1" should read -- 2 --. Column 17, line 58, "a pair of side-by-side" should read -- one or more --; line 60, "of said units" should read -- unit --. Column 18, line 9, "ends" should read -- end --; same line 9, "casings" should read -- casing --; line 16, "casings" should read -- casing --; line 17, "outlets" should read -- outlet --; line 34, "suitable" should read -- stubble --.

Signed and sealed this 19th day of February 1974.

(SEAL)
Attest:

EDWARD M. FLETCHER, JR.
Attesting Officer

C. MARSHALL DANN
Commissioner of Patents